UNITED STATES PATENT OFFICE.

ROBERT W. LESLEY, OF PHILADELPHIA, PENNSYLVANIA.

HYDRAULIC CEMENT.

SPECIFICATION forming part of Letters Patent No. 582,068, dated May 4, 1897.

Application filed March 17, 1897. Serial No. 628,016. (No specimens.)

*To all whom it may concern:*

Be it known that I, ROBERT W. LESLEY, a citizen of the United States, and a resident of the city and county of Philadelphia, State of Pennsylvania, have invented a new and useful Improvement in the Manufacture of Hydraulic Cements, of which the following is a specification.

My invention has relation to artificial hydraulic or Portland cements. These cements are produced by mixtures of chalk and clay, limestone and clay, argillaceous limestones and lime, or other similar materials. The mixture is made by grinding or otherwise commingling the ingredients, and the resultant product in general practice is made with water into a slurry or paste, which in turn is made into bricks, lumps, balls, or other forms adapted to the set, rotary, continuous, or other forms of kilns used for calcination. This burning is done at high heat and the resultant clinker is ground to produce the Portland cement of commerce.

First, many of these cements are quick-setting and for this and other reasons do not attain great tensile strength at short periods or in a short time; second, others are over-limed and contain free lime either in shape of caustic lime, which causes checking and cracking, or in the form of free over-burned lime, which in time causes disintegration of the cement; third, others are deficient in silicic acid, and by reason of an excess of alumina or of lime are either too quick-setting or the reverse; fourth, others, by reason of an excess of alumina, make up into mortars that are too brash for use. To overcome these various difficulties, numerous methods have been devised.

In the first case it has been customary heretofore to introduce into or mix with the clinker, after the calcination and before or during the grinding or milling, foreign substances of various kinds, usually gypsum or calcined plaster either in rock or powdered form. In the second case sprinkling with water under the process described by E. J. De Smedt in his Patent No. 263,873, issued September 5, 1882, has been resorted to for the purpose of hydrating the free lime and thereby converting it into hydrate of lime, which is not injurious to the cement. In the third case additional silica has been added before calcination at great expense for grinding and for fire and additional alkalies to reduce it to the proper gelatinous condition for combination with the other cement-making ingredients. In the fourth case hydrate of lime in the form of carefully-slaked lime has been added for the purpose of providing a flux and making the mortar mixture less brash. In all these cases, and, indeed, in Portland cement generally, it has been recognized that free lime almost invariably exists in the manufactured cement, and much difficulty has been experienced in properly caring for this element. My invention is designed to obviate this difficulty and is designed not merely to neutralize the injurious element in the cement, but to convert it into an active agent in the improvement of the cement itself. To this end I add to the cement-making material after calcination, whether in clinker or powdered form, dilute sulfuric acid or a combination of that acid and a salt in solution, as hereinafter described.

To illustrate the nature of my invention, I will describe it in more particular connection with a cement of class one above recited. A cement of this class is too quick-setting and, although of good quality, does not attain great tensile strength at all quickly or within a short period. In order to remedy these defects, the ordinary practice has been to add to the cement-making material after calcination gypsum or calcined plaster and to grind this with the mass of cement-making material. In adding these substances much difficulty has been experienced in securing a thorough and uniform admixture. Furthermore, the lime in the chemical combination of gypsum or plaster is of no practical use in the manufactured cement, but, on the contrary, is a detriment, and in many cases, either by itself or in excessive quantities as a sulfate of lime, causes the deterioration and destruction of the mortar made from the cement.

I have found that the same slow-setting effect, as well as quickly-imparted increased tensile strength, can be obtained with very much greater precision and efficiency by the employment of sulfuric acid, which I have ascertained by numerous experiments to be the agent to which the effects hitherto attributed to gypsum or plaster are due. By the employment of this agent I am enabled not only to obtain very much more thorough and even admixture, thus securing uniformity of quality, but by avoiding the excess of lime which necessarily attends the use of gypsum or plaster I materially enhance and improve the quality of the product.

Another advantage which my invention possesses over the method now in use is that the sulfuric acid is a fixed chemical product ready for immediate use and whose strength is capable of rapid determination, whereas the plaster and gypsum, while they may be sulfate of lime, yet may vary greatly in their chemical constituents. In the former this may be due to the conditions of calcination and subsequent treatment, while in the latter it may be due to the handling and storage of the rock and the water it may thus carry in addition to its natural water of crystallization, the fact being that two batches are rarely alike, producing, as a consequence, similar variations in the quality of the cement to which they are added.

Another advantage is that the sulfuric acid, having natural affinity for lime, acts upon any free lime in the cement-making material and at once neutralizes it, forming hydrated sulfate of lime, whose presence is very valuable and very potent in effecting the crystallization of the material by acting either directly or indirectly upon the alumina, thereby producing a greater tensile strength in the cement within short periods and also making the cement slower setting. It (the hydrated sulfate of lime) is better than sulfate of lime because, among other things, it does not carry with it any excess of lime. The effect of the formation of this hydrated sulfate is to make active any inert caustic lime formed by the high temperature at which Portland cement is burned, probably by bringing it in contact with a salt-containing water, which salt gives up its water of crystallization, and thus forms a double reaction. The addition of the sulfuric acid forms either sulfate of lime from the free lime or sulfoaluminate of lime from the alumina, both of which salts are insoluble.

The same mode of treatment can be availed of for the other classes of cement above referred to.

I have found that the use of free sulfuric acid alone in solution is preferable to the use of the acid combined with any salt of lime, though in cases where the percentage of lime in the cement or clinker to be treated is not very high I have attained good results by the addition to the sulfuric-acid solution of small percentages of sulfate of lime or hydrate of lime, these percentages of course being so small as not to furnish to the cement the excess of lime which it is the object of my invention to avoid; and I have also attained similar results by adding said small percentages in a dry state to the cement-making material after calcination, either before or after sprinkling the material with the solution, and I desire to be understood as including any such mere modifications in my claim. So, also, where great difficulty is found in bringing the raw material, when slightly deficient in silica, up to a condition for making the artificial Portland cement the trouble may be obviated, without departure from my invention, by the addition, after calcination, of silicate of soda, which is mixed with the sulfuric acid in a solution of water and then sprinkled upon the clinker or powder after calcination. The silicic acid in this form is in a nascent condition and acts vigorously upon the clinker or powder, supplying the necessary ingredient which was lacking and neutralizing the excess of free lime, with which it combines as silicate of lime. It lengthens the time of setting and increases the quality and strength of the cement.

In practice and as the best practical way of carrying my invention into effect I proceed as follows: For any good batch of calcined clinker I take from one-fourth to three per cent. by weight of sulfuric acid. I dilute the acid with water in any desired amount, taking care, of course, not to use that liquid to such an excess as to "drown" the clinker or cause it to set. This solution is then, with a sprinkling-can, a rose, or any form of atomizer or other similar instrument, sprinkled over the batch of clinker after calcination and before or during the milling or grinding operation. Similar results may be obtained by sprinkling the powdered cement after grinding, with the above-described solution in the form of a spray or vapor, by the means described, for example, in Patent No. 321,121, granted to David Griffith and myself on June 30, 1885, or in any other suitable way.

What I claim as new and of my invention is—

The method of producing slow-setting artificial Portland cement, which consists in treating the cement-making material after calcination, whether in the form of clinker or powder, with dilute sulfuric acid, substantially as hereinbefore set forth.

In testimony whereof I have hereunto set my hand this 11th day of March, 1897.

ROBERT W. LESLEY.

Witnesses:
JOHN W. TRINDLE,
H. B. WARNER.